United States Patent
Yurgil et al.

(10) Patent No.: US 7,979,176 B2
(45) Date of Patent: Jul. 12, 2011

(54) SERPENTINE BELT USEFUL LIFE MONITOR

(75) Inventors: James R. Yurgil, Livonia, MI (US); Eric Brian Schutt, Oxford, MI (US)

(73) Assignee: GM Global Technology Operations LLC

(*) Notice: Subject to any disclaimer, the term of this patent is extended or adjusted under 35 U.S.C. 154(b) by 571 days.

(21) Appl. No.: 12/165,856

(22) Filed: Jul. 1, 2008

(65) Prior Publication Data
US 2009/0198403 A1 Aug. 6, 2009

Related U.S. Application Data

(60) Provisional application No. 61/025,543, filed on Feb. 1, 2008.

(51) Int. Cl.
*G01M 17/00* (2006.01)
(52) U.S. Cl. .......... 701/29; 701/58; 701/115; 701/35
(58) Field of Classification Search .......... 701/1, 29, 701/33, 35, 47, 58, 73, 115; 474/8, 17, 28, 474/148, 166, 237–273
See application file for complete search history.

(56) References Cited

U.S. PATENT DOCUMENTS

| | | | |
|---|---|---|---|
| 6,029,512 A * | 2/2000 | Suganuma et al. | 73/114.59 |
| 7,016,818 B1 * | 3/2006 | Kido et al. | 703/2 |
| 2008/0021603 A1 * | 1/2008 | Zettel et al. | 701/29 |
| 2010/0060677 A1 * | 3/2010 | Jones et al. | 347/5 |
| 2010/0193268 A1 * | 8/2010 | McGee | 180/65.21 |
| 2010/0318270 A1 * | 12/2010 | Yamanaka et al. | 701/58 |

FOREIGN PATENT DOCUMENTS
| | | | | |
|---|---|---|---|---|
| JP | 2000034082 A | * | 2/2000 | |
| JP | 2001059555 A | * | 3/2001 | |

* cited by examiner

*Primary Examiner* — John Q Nguyen
*Assistant Examiner* — Michael Ng

(57) ABSTRACT

A control module of a vehicle comprises a drive diagnostic module and a power determination module. The drive diagnostic module determines a slip power of a belt based on engine speed, motor speed, and motor torque. The power determination module determines an accumulated power of the belt based on the slip power, the motor speed, and the motor torque. The control module diagnoses a condition of the belt based on the accumulated power.

22 Claims, 5 Drawing Sheets

SERPENTINE BELT USEFUL LIFE MONITOR

CROSS-REFERENCE TO RELATED APPLICATIONS

This application claims the benefit of U.S. Provisional Application No. 61/025,543, filed on Feb. 1, 2008. The disclosure of the above application is incorporated herein by reference.

FIELD

The present disclosure relates to accessory drive systems, and more specifically to a serpentine belt useful life monitor for accessory drive systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric hybrid vehicles may include an internal combustion engine, an electric drive motor, and a rechargeable battery that powers the motor. The motor may transmit power and may charge the battery. An engagement may connect the motor with an engine crankshaft. The engagement may include an accessory drive system. The accessory drive system may include a serpentine belt engaged with the crankshaft and an input/output of the motor to transfer rotation therebetween.

Traditional useful life testing of the belt uses a predefined load schedule of the belt. Results of this testing cannot be used to accurately predict the useful life of the belt with different load conditions or with a different load schedule. Additional components, such as a belt alternator starter, added to the accessory drive system may cause the different load conditions and schedule of the belt.

SUMMARY

A control module of a vehicle comprises a drive diagnostic module and a power determination module. The drive diagnostic module determines a slip power of a belt based on engine speed, motor speed, and motor torque. The power determination module determines an accumulated power of the belt based on the slip power, the motor speed, and the motor torque. The control module diagnoses a condition of the belt based on the accumulated power.

A method of operating a control module of a vehicle comprises determining a slip power of a belt based on engine speed, motor speed, and motor torque, determining an accumulated power of the belt based on the slip power, the motor speed, and the motor torque, and diagnosing a condition of the belt based on the accumulated power.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The present disclosure will become more fully understood from the detailed description and the accompanying drawings, wherein.

DETAILED DESCRIPTION

Figure 1:
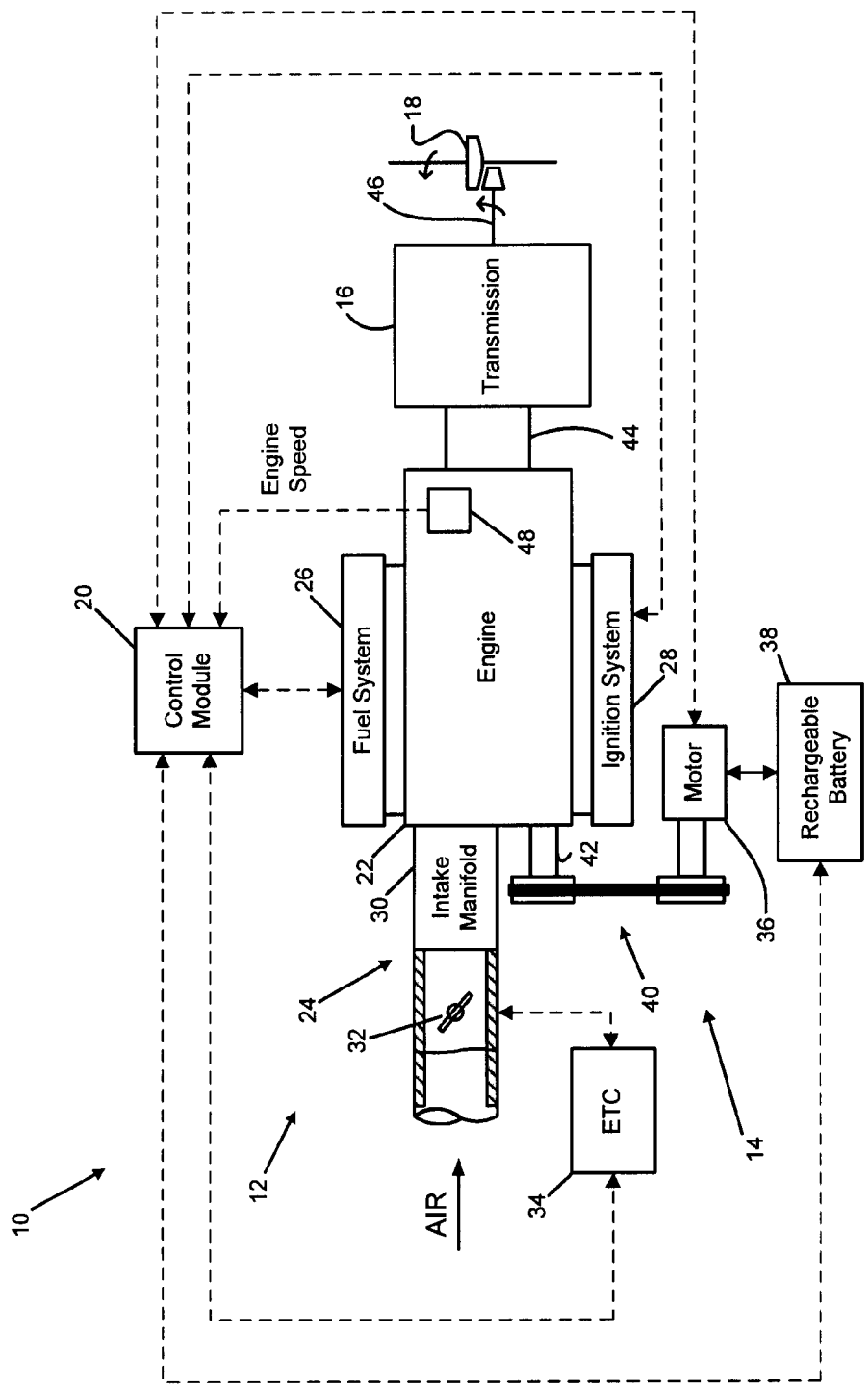
FIG. 1 is a functional block diagram of an exemplary electric hybrid vehicle according to the principles of the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary electric hybrid vehicle 10 is shown. The vehicle 10 includes an engine assembly 12, a hybrid power assembly 14, a transmission 16, a drive axle 18, and a control module 20. The engine assembly 12 includes an internal combustion engine 22 in communication with an intake system 24, a fuel system 26, and an ignition system 28.

The intake system 24 includes an intake manifold 30, a throttle 32, and an electronic throttle control (ETC) 34. The ETC 34 controls the throttle 32 to control an airflow into the engine 22. The fuel system 26 includes fuel injectors (not shown) to control a fuel flow into the engine 22. The ignition system 28 ignites an air/fuel mixture provided to the engine 22 by the intake system 24 and the fuel system 26.

The hybrid power assembly 14 includes an electric drive motor 36 and a rechargeable battery 38. The motor 36 is in electrical communication with the battery 38 to convert power from the battery 38 to mechanical power. The motor 36 is additionally operated as a generator to provide power to charge the battery 38. The engine 22 and the motor 36 are coupled via an accessory drive system 40.

The engine assembly 12 drives the transmission 16. The engine 22 includes a crankshaft 42 coupled to the transmission 16 via a coupling device 44. The coupling device 44 may include a friction clutch or a torque converter. The transmission 16 uses the power provided from the engine 22 and/or the motor 36 to drive an output shaft 46 and to power rotation of the drive axle 18. Alternatively, rotation of the drive axle 18 is used to power rotation of the crankshaft 42 and to drive the motor 36 for recharging of the battery 38.

The control module 20 is in communication with the fuel system 26, the ignition system 28, the ETC 34, the motor 36, and the battery 38. The vehicle 10 measures a speed of the crankshaft 42 (i.e., an engine speed) using an engine speed sensor 48. The engine speed sensor 48 may be located within the engine 22 or at other locations, such as on the crankshaft 42 (not shown), for example. The control module 20 receives the engine speed. The control module 20 controls operation of the engine 22 and the motor 36 and selectively controls recharging of the battery 38.

Figure 2:
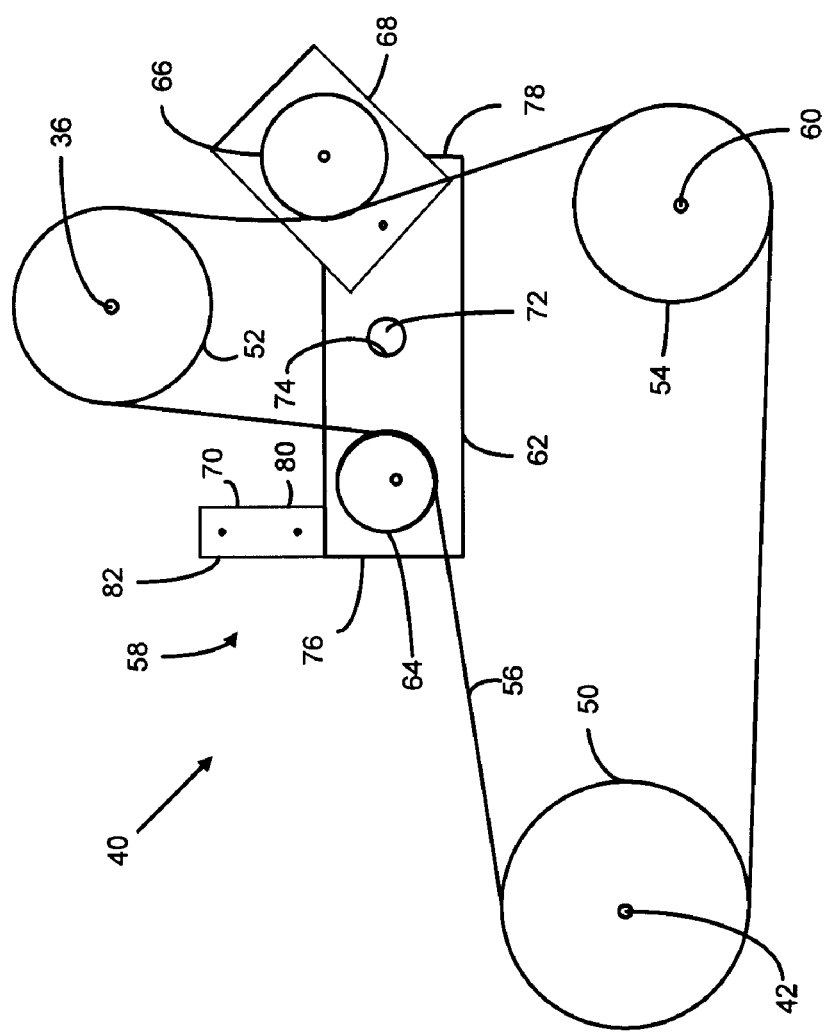
FIG. 2 is a functional block diagram of an exemplary accessory drive system of the vehicle according to the principles of the present disclosure.

With reference to FIG. 2, the accessory drive system 40 is presented and includes first, second, and third hubs 50, 52, 54, a serpentine belt 56, and a tensioner assembly 58. The first hub 50 is fixed to the crankshaft 42 for rotation therewith. The second hub 52 is fixed to an output of the motor 36. The third hub 54 is fixed to an additional component 60 driven by the crankshaft 42 and/or the motor 36, such as a belt alternator starter. The belt 56 is engaged with the first, the second and the third hubs 50, 52, 54 to transfer rotation therebetween.

The tensioner assembly 58 includes a bracket 62, first and second belt tensioner hubs 64, 66, a friction damped rotary tensioner 68, a hydraulic strut tensioner 70, and a pivot coupling 72. The bracket 62 includes an aperture 74 located between first and second ends 76, 78 thereof. The first and the second belt tensioner hubs 64, 66 is rotatably coupled to the first and the second ends 76, 78, respectively. More specifically, the second belt tensioner hub 66 is coupled to the friction damped rotary tensioner 68 which is coupled to the second end 78. The hydraulic strut tensioner 70 includes a first end 80 coupled to the first end 76 of the bracket 62 and a second end 82 coupled to the engine 22.

Figure 3:
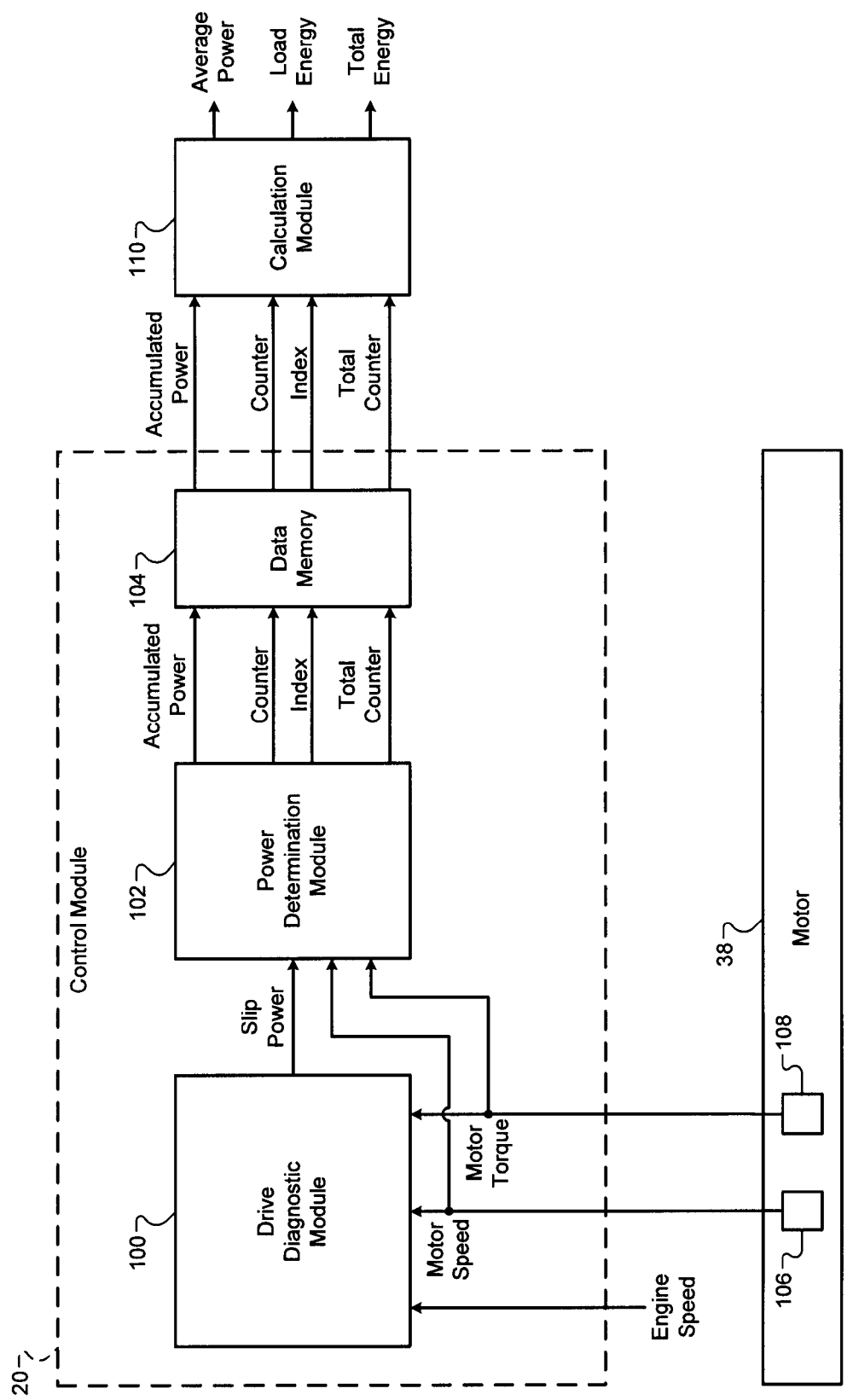
FIG. 3 is a functional block diagram of an exemplary control module of the vehicle according to the principles of the present disclosure.

Referring now to FIG. 3, the control module 20 includes a drive diagnostic module 100, a power determination module 102, and a data memory 104. A speed of the output of the motor 36 (i.e., a motor speed) is measured using a motor speed sensor 106. A torque of the output of the motor 36 (i.e., a motor torque) is measured using a motor torque sensor 108. The motor speed and the motor torque sensors 106, 108 may be located within the motor 36 or at other locations, such as on the output of the motor 36 (not shown), for example.

The drive diagnostic module 100 receives the engine speed, the motor speed, and the motor torque. The drive diagnostic module 100 determines an instant power of a slip of the belt 56 (i.e., a slip power) based on the engine speed, the motor speed, and the motor torque. The power determination module 102 receives the slip power, the motor speed, and the motor torque.

The power determination module 102 determines an index based on the motor speed and the motor torque. The power determination module 102 determines the index to be one of a number of categories of power. The power determination module 102 categorizes the slip power based on the index.

The power determination module 102 further determines a cumulative power of the slip of the belt 56 (i.e., an accumulated power) based on the index and the slip power. The power determination module 102 categorizes the accumulated power based on the index. In other words, the accumulated power of the category of power described by the index is determined by accumulating the slip power of the category.

The power determination module 102 further determines a number of times that the categorized slip power has been accumulated (i.e., a counter) based on the index. The power determination module 102 determines the counter by incrementing the counter of the category of power described by the index when the slip power of the category is accumulated. The power determination module 102 further determines a number of times that any slip power has been accumulated (i.e., a total counter). The power determination module 102 determines the total counter by incrementing the total counter when any slip power is accumulated.

The data memory 104 receives the accumulated power, the counter, the index, and the total counter. The data memory 104 includes an array of stored accumulated powers that are accessed based on the index. The data memory 104 stores the accumulated power in the array by setting the stored accumulated power that is accessed based on the index to the accumulated power.

The data memory 104 includes an array of stored counters that are accessed based on the index. The data memory 104 stores the counter in the array by setting the stored counter that is accessed based on the index to the counter. The data memory 104 includes a stored total counter. The data memory 104 stores the total counter by setting the stored total counter to the total counter.

A calculation module 110 may receive the accumulated power, the counter, the index, and the total counter from the data memory 104. The calculation module 110 may determine an average power of the slip of the belt 56 (i.e., an average power) based on the accumulated power, the index, and the counter. An average power $P_{avg}$ may be determined according to the following equation:

$$P_{avg}[\text{INDEX}] = P_{accum}[\text{INDEX}]/\text{COUNTER}[\text{INDEX}], \quad (1)$$

where INDEX is the index, $P_{accum}$ is the accumulated power, and COUNTER is the counter.

The calculation module 110 may further determine a transient, cumulative energy used to drive loads on the accessory drive system 40 (i.e., a load energy) based on the accumulated power and the index. A load energy E may be determined according to the following equation:

$$E[\text{INDEX}] = P_{accum}[\text{INDEX}]\Delta t, \quad (2)$$

where $\Delta t$ is a change in time between determining the load energy. The calculation module 110 may further determine a total load energy based on the load energy and the index when a sum of the stored counters is equal to the total counter. A total load energy $E_{total}$ may be determined according to the following equation:

$$E_{total} = \Sigma E[\text{INDEX}], \text{ if } \Sigma\text{COUNTER}[\text{INDEX}] = \text{COUNTER}_{total}, \quad (3)$$

where $\text{COUNTER}_{total}$ is the total counter. The calculation module 110 may be located near the control module 20 or at other locations, such as within the control module 20 (not shown), for example.

The total load energy may be correlated to a useful life of the belt 56 or to incidents of failure or severe wear of the belt 56. This correlation may be used to accurately predict the useful life of the belt 56. In addition, because the load energy may be monitored, the correlation may be used to predict the useful life of the belt 56 with different load conditions or with a different load schedule.

Figure 4:
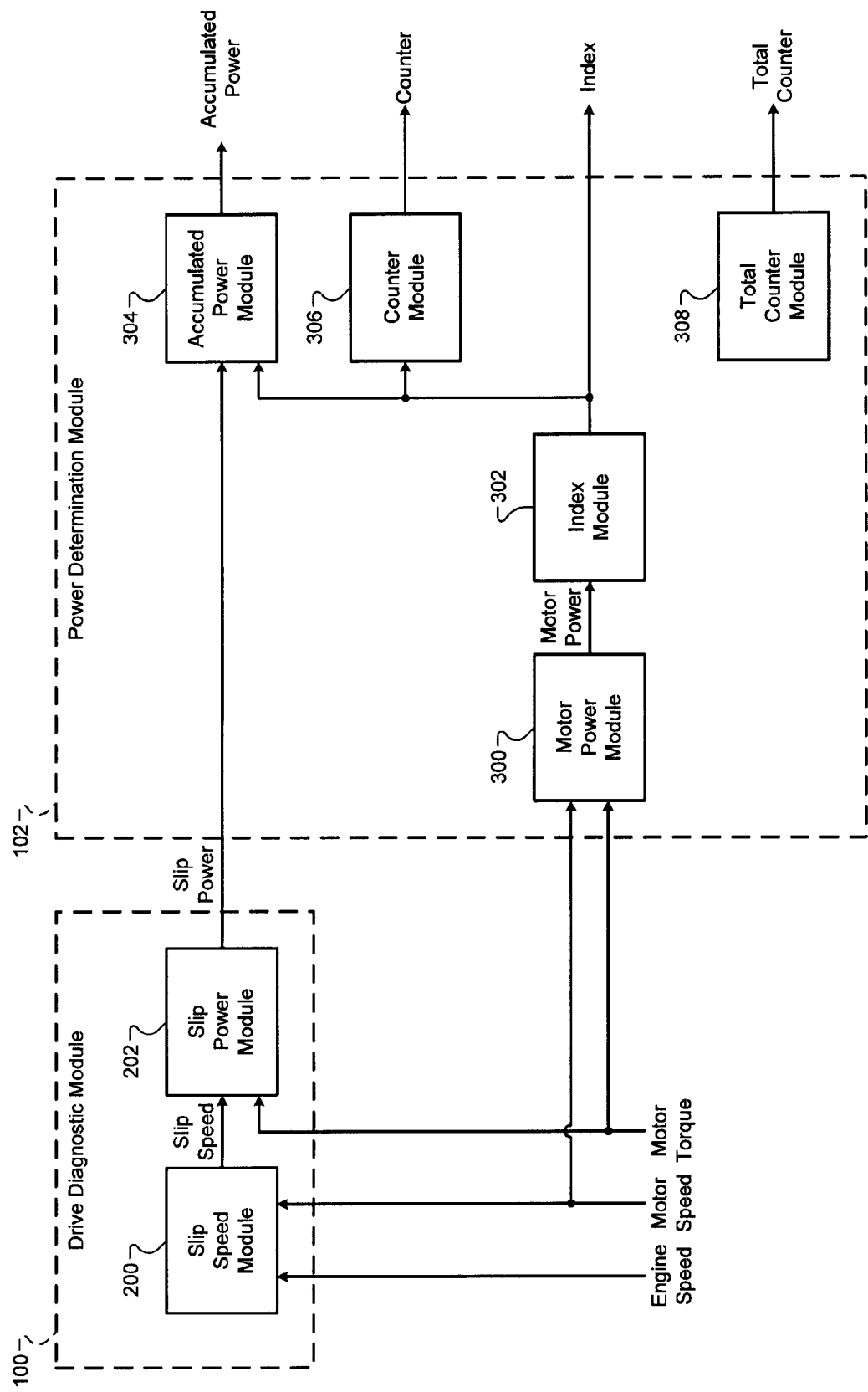
FIG. 4 is a functional block diagram of an exemplary drive diagnostic module and an exemplary power determination module of the control module according to the principles of the present disclosure.

Referring now to FIG. 4, the drive diagnostic module 100 and the power determination module 102 is presented. The drive diagnostic module 100 includes a slip speed module 200 and a slip power module 202. The power determination module 102 includes a motor power module 300, an index module 302, an accumulated power module 304, a counter module 306, and a total counter module 308.

The slip speed module 200 receives the engine and the motor speeds. The slip speed module 200 determines a speed of the slip of the belt 56 (i.e., a slip speed) based on the engine and the motor speeds. The slip speed is initially set to zero. A slip speed $v_{slip}$ is determined according to the following equation:

$$v_{slip}(t)=v_{slip}(t-dt)+k_{slip}(v_{mot}(t)-k_{eng}v_{eng}(t)-v_{slip}(t-dt)), \quad (4)$$

where t−dt is a time associated with a previously determined slip speed, $k_{slip}$ is a predetermined constant (i.e., a smoothing factor) between 0 and 1 in value, $v_{mot}$ is the motor speed, $k_{eng}$ is a predetermined engine speed constant, and $v_{eng}$ is the engine speed.

The slip power module 202 receives the slip speed and the motor torque. The slip power module 202 determines the slip power based on the slip speed and the motor torque. A slip power $P_{slip}$ is determined according to the following equation:

$$P_{slip}=2\pi/60 \times T_{mot}v_{slip}, \quad (5)$$

where $T_{mot}$ is the motor torque.

The motor power module 300 receives the motor speed and the motor torque. The motor power module 300 determines the motor power based on the motor speed and the motor torque. A motor power $P_{mot}$ is determined according to the following equation:

$$P_{mot}=2\pi/60 \times T_{mot}v_{mot}. \quad (6)$$

The index module 302 receives the motor power. The index module 302 determines the index based on the motor power, for example, from a look-up table. For example only, the index may be determined to be one of eleven categories of power: 1) power less than −10 kilowatts (kW), 2) power greater than or equal to −10 kW and less than −8 kW, 3) power greater than or equal to −8 kW and less than −6 kW, 4) power greater than or equal to −6 kW and less than −4 kW, 5) power greater than or equal to −4 kW and less than −2 kW, 6) power greater than or equal to −2 kW and less than 2 kW, 7) power greater than or equal to 2 kW and less than 4 kW, 8) power greater than or equal to 4 kW and less than 6 kW, 9) power greater than or equal to 6 kW and less than 8 kW, 10) power greater than or equal to 8 kW and less than 10 kW, and 11) power greater than or equal to 10 kW.

For example only, the index may be determined to be one of three broader categories of power: 1) low absolute power, 2) midrange absolute power, and 3) high absolute power. For example only, the index may be determined to be one of five narrower categories of power: 1) high negative power (e.g., power less than −8 kW), 2) midrange negative power (e.g., power greater than or equal to −8 kW and less than −2 kW), 3) low absolute power (e.g., power greater than or equal to −2 kW and less than 2 kW), 4) midrange positive power (e.g., power greater than or equal to 2 kW and less than 8 kW), and 5) high positive power (e.g., power greater than or equal to 8 kW). The index may be determined to be one of a number of categories of power that is fewer or greater in number than the examples mentioned.

The accumulated power module 304 receives the index and the slip power. The accumulated power module 304 determines the accumulated power based on the index and the slip power. An accumulated power $P_{accum}$ is determined according to the following equation:

$$P_{accum}[\text{INDEX}]=P_{accum}[\text{INDEX}]+P_{slip}. \quad (7)$$

The counter module 306 receives the index. The counter module 306 determines the counter based on the index when the slip power of the category described by the index is accumulated. A counter COUNTER is determined according to the following equation:

$$\text{COUNTER}[\text{INDEX}]=\text{COUNTER}[\text{INDEX}]+1. \quad (8)$$

The total counter module 308 determines the total counter when any slip power is accumulated. A total counter $\text{COUNTER}_{total}$ is determined according to the following equation:

$$\text{COUNTER}_{total}=\text{COUNTER}_{total}+1. \quad (9)$$

Figure 5:
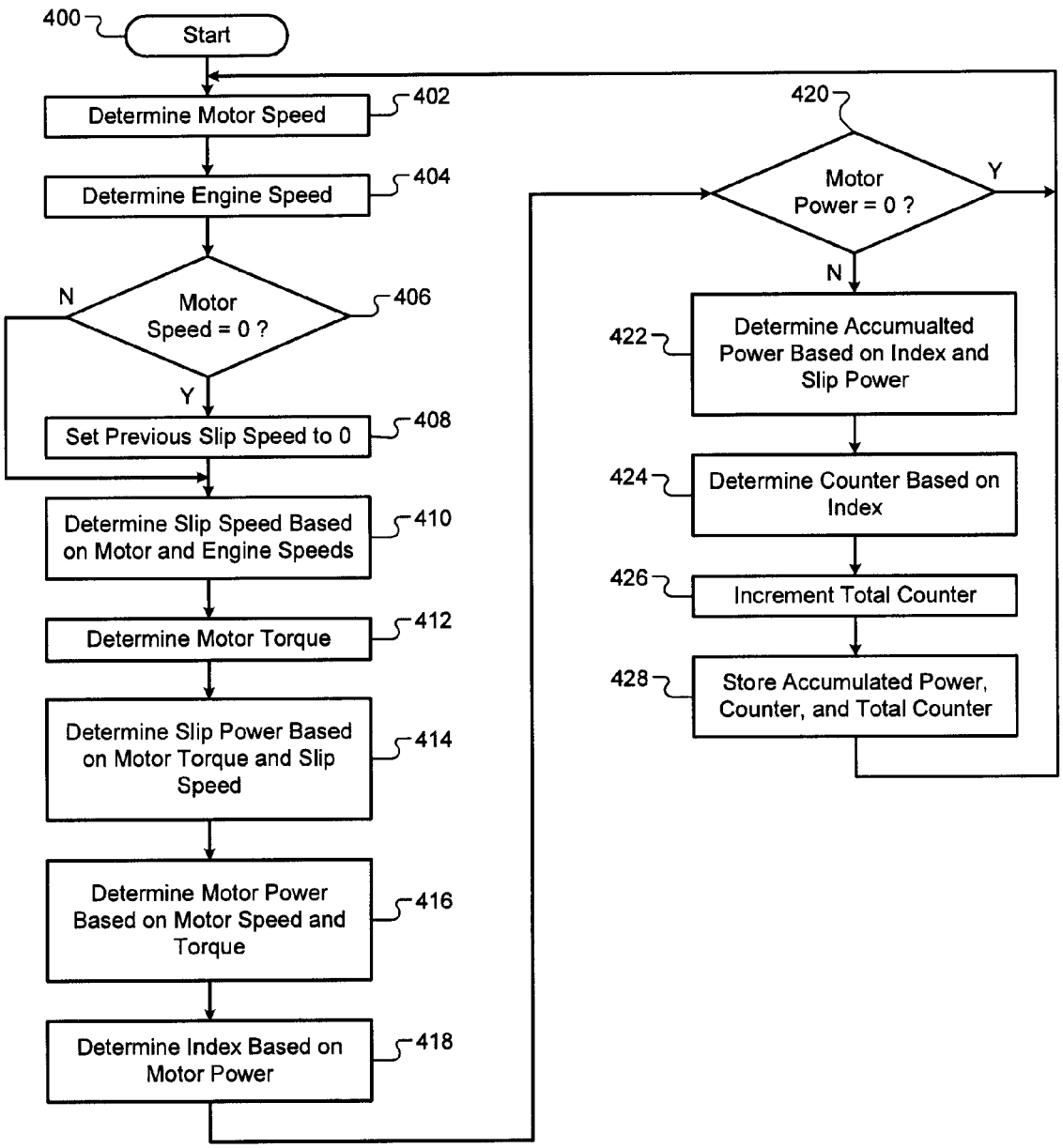
FIG. 5 is a flowchart depicting exemplary steps performed by the control module according to the principles of the present disclosure.

Referring now to FIG. 5, a flowchart depicts exemplary steps performed by the control module 20. Control begins in step 400. In step 402, the motor speed is determined. In step 404, the engine speed is determined. In step 406, control determines whether the motor speed is equal to zero. If true, control continues in step 408. If false, control continues in step 410.

In step 408, the previously determined slip speed (i.e., a previous slip speed) is set to zero. In step 410, the slip speed is determined based on the motor and the engine speeds. In step 412, the motor torque is determined.

In step 414, the slip power is determined based on the motor torque and the slip speed. In step 416, the motor power is determined based on the motor speed and the motor torque. In step 418, the index is determined based on the motor power.

In step 420, control determines whether the motor power is equal to zero. If false, control continues in step 422. If true, control returns to step 402. In step 422, the accumulated power is determined based on the index and the slip power. In step 424, the counter is determined based on the index. In step 426, the total counter is incremented. In step 428, the accumulated power, the counter, and the total counter are stored in the data memory 104. Control returns to step 402.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control module of a vehicle comprising:
   a drive diagnostic module that determines a slip power of a belt based on engine speed, motor speed, and motor torque; and
   a power determination module that determines an accumulated power of the belt over a period of time based on the slip power, the motor speed, and the motor torque,
   wherein the control module diagnoses a condition of the belt based on the accumulated power.

2. The control module of claim 1 wherein the drive diagnostic module further comprises a slip power module that determines the slip power based on the motor torque and a slip speed of the belt.

3. The control module of claim 2 wherein the drive diagnostic module further comprises a slip speed module that determines the slip speed based on the engine speed and the motor speed.

4. The control module of claim 1 wherein the power determination module further comprises an accumulated power module that determines the accumulated power based on an index and the slip power.

5. The control module of claim 4 wherein the power determination module further comprises an index module that determines the index based on a motor power.

6. The control module of claim 5 wherein the power determination module further comprises a motor power module that determines the motor power based on the motor speed and the motor torque.

7. The control module of claim 1 wherein the power determination module further comprises a counter module that determines a counter value based on an index.

8. The control module of claim 7 wherein an average power of the belt is determined based on the accumulated power, the index, and the counter value.

9. The control module of claim 7 wherein the power determination module further comprises a total counter module that increments a total counter value when the accumulated power is determined.

10. The control module of claim 9 wherein a load energy of an accessory drive system of the vehicle is determined based on the accumulated power and the index.

11. The control module of claim 10 wherein a total load energy is determined based on the load energy and the index when a sum of stored counter values is equal to the total counter value.

12. A method of operating a control module of a vehicle comprising:
    determining a slip power of a belt based on engine speed, motor speed, and motor torque;
    determining an accumulated power of the belt over a period of time based on the slip power, the motor speed, and the motor torque; and
    diagnosing a condition of the belt based on the accumulated power.

13. The method of claim 12 further comprising determining the slip power based on the motor torque and a slip speed of the belt.

14. The method of claim 13 further comprising determining the slip speed based on the engine speed and the motor speed.

15. The method of claim 12 further comprising determining the accumulated power based on an index and the slip power.

16. The method of claim 15 further comprising determining the index based on a motor power.

17. The method of claim 16 further comprising determining the motor power based on the motor speed and the motor torque.

18. The method of claim 12 further comprising determining a counter value based on an index.

19. The method of claim 18 further comprising determining an average power of the belt based on the accumulated power, the index, and the counter value.

20. The method of claim 18 further comprising incrementing a total counter value when the accumulated power is determined.

21. The method of claim 20 further comprising determining a load energy of an accessory drive system of the vehicle based on the accumulated power and the index.

22. The method of claim 21 further comprising determining a total load energy based on the load energy and the index when a sum of stored counter values is equal to the total counter value.

* * * * *